Dec. 8, 1959 T. J. KRUSE, JR 2,916,441
PROCESS AND APPARATUS FOR CONTROLLING THE
RATE OF ADDITION OF FLUIDIZED PARTICLES
Filed Oct. 29, 1956 2 Sheets-Sheet 1

Theodore J. Kruse, Jr. Inventor

By George J. Silhavy Attorney

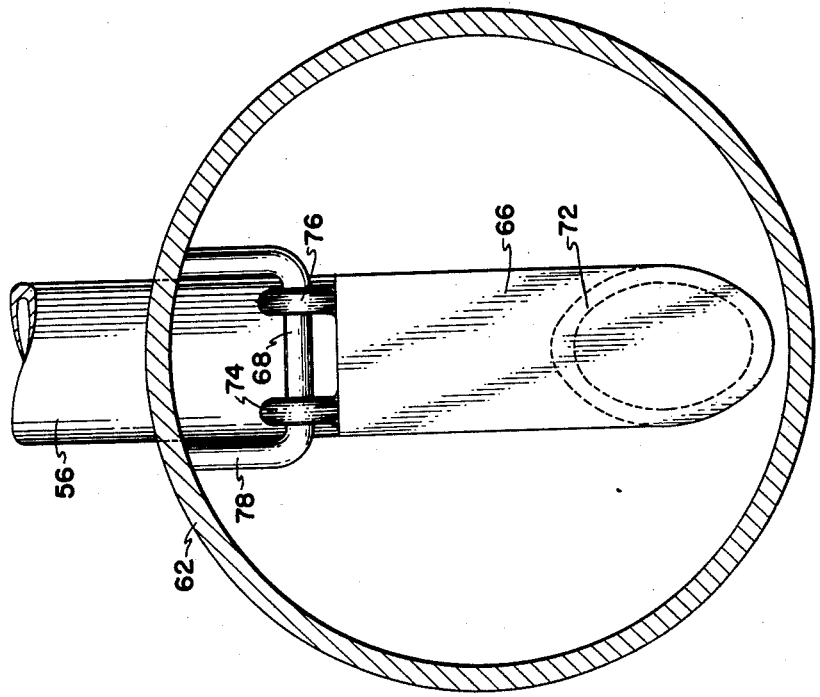
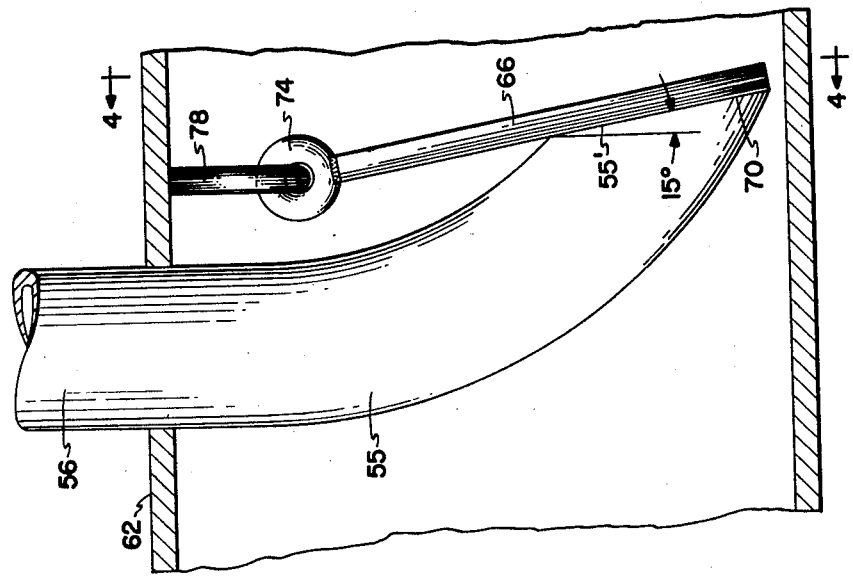

United States Patent Office 2,916,441
Patented Dec. 8, 1959

2,916,441

PROCESS AND APPARATUS FOR CONTROLLING THE RATE OF ADDITION OF FLUIDIZED PARTICLES

Theodore John Kruse, Jr., Baton Rouge, La., assignor to Esso Research and Engineering Company, a corporation of Delaware Application October 29, 1956, Serial No. 618,920

12 Claims. (Cl. 208—152)

This invention relates to a system for continuously or periodically adding finely divided solids to a unit wherein finely divided solids are contacted with gases or vapors either to carry out some reaction or to absorb some material perferentially or to separate one component from another component or a mixture of components.

More specifically the present invention relates to a system wherein finely divided catalyst is transferred from a storage or addition drum to a plant or catalytic cracking unit by discharging the catalyst from the drum to a catalyst unit.

In the catalytic cracking of hydrocarbons the cracking catalyst loses its activity the longer it resides in the unit, and it is usual practice to daily replace some of the used catalyst in the unit with fresh catalyst to maintain average catalyst activity at the desired level. The amount of fresh catalyst added daily amounts to about 1% to 5% of catalyst inventory in a catalytic cracking unit. This is usually referred to as make-up catalyst. Used catalyst is withdrawn from the unit as required to hold unit inventory constant. For a 50,000 b./d. catalytic cracking unit, the fresh catalyst addition rate will normally average between 5 and 20 t./d. It is therefore necessary that a catalytic cracking unit have a supply of cracking catalyst on hand, a storage drum for storing the catalyst, and means for adding the catalyst to the unit.

Catalyst is added to most commercial plants by discharging the particles from a drum into a stream of air and blowing the particles into the unit. In previous practice in commercial units, the daily charge of fresh catalyst was added all at one time, or one-half charge added twice daily, or one-third charge added three times daily. The addition systems lacked a means of measuring or controlling the addition rate during the catalyst addition process, and consequently the whole batch of catalyst was added in 10 to 30 minutes. As a result of the sudden change in activity of the average catalyst in the unit, operation of the catalytic cracking unit was temporarily upset.

Fresh cracking catalyst is about five times as active as the average used catalyst in the unit. Although it gradually loses its high activity on exposure to heat and water vapor, fresh catalyst is quite active for about ½ hour after being added. When fresh catalyst is added at a rate of about 2% of inventory per hour for 20 to 30 minutes, the concentration of fresh catalyst in the unit becomes high enough to temporarily increase the reaction rate, causing more coke to be formed on the catalyst in the reactor. Commercial catalytic cracking units normally utilize all available air for regeneration, so there is no air to burn the excess coke produced. The carbon content of the catalyst will therefore build up and when this catalyst containing a higher percentage of carbon is transferred to the reactor, the carbon yield will be proportionately greater. To stop the carbon buildup, oil feed is reduced. When the excess carbon is burned off in the regeneration zone, high temperatures are reached and this often results in severe damage to the regenerator internals or to the cyclone separators. To avoid the high temperatures, the operators of the catalytic cracking unit reduce feed rate or cracking conversion before adding fresh catalyst, in order to have more regeneration air available for burning off the excess carbon to be produced but this was not a proper solution of the problem because of the inefficient use of regenerator air before and after the addition of catalyst, and because this precaution did not entirely eliminate the possibility of a carbon buildup on catalyst and its consequences.

According to the present invention, finely divided cracking catalyst is transferred from a storage drum or an addition drum to a plant catalytic cracking unit by pressuring the storage or addition drum, and this forces the finely divided catalyst out of the drum through a damper valve into a constant velocity air stream. The air carries the catalyst through a metering riser, and at constant air velocity the riser pressure differential is a function of the rate of flow of catalyst. A pressure differential controller on the metering riser controls the pressuring device on the storage or addition drum, thereby insuring substantially constant flow of catalyst to the cracking unit. After passing through the metering riser, the fresh catalyst is carried by the air stream to the unit and preferably is introduced into the spent catalyst riser leading to the regeneration zone.

According to the present invention the pressure drop across the metering riser is set by the operator to maintain the selected rate of fresh catalyst addition to the unit. It is therefore possible to add catalyst continuously over extended periods of time and at a substantially constant rate. The constant, slow rate of addition eliminates upsets to the catalytic cracking unit caused by the rapid addition of fresh catalyst and eliminates the need to operate the regenerator inefficiently in order to prevent such upsets. Without the present invention, when feeding 10 tons of fresh catalyst to a cracking unit, this was done in two or three one-half hour periods, whereas with the present invention the time for introducing the same amount of 10 tons may be set at the option of the operator to take between 12 to 24 hours and the introduction of fresh active catalyst will be substantially slower and at a rate which will not produce a temporary increase in activity of average catalyst in the unit.

In the drawings:

Fig. 3 is a partial vertical cross-sectional view of a detail of the feeding means which introduces the catalyst into the conduit; and Fig. 4 represents a vertical cross-section taken substantially on line 4—4 of Fig. 3.

Figure 1:
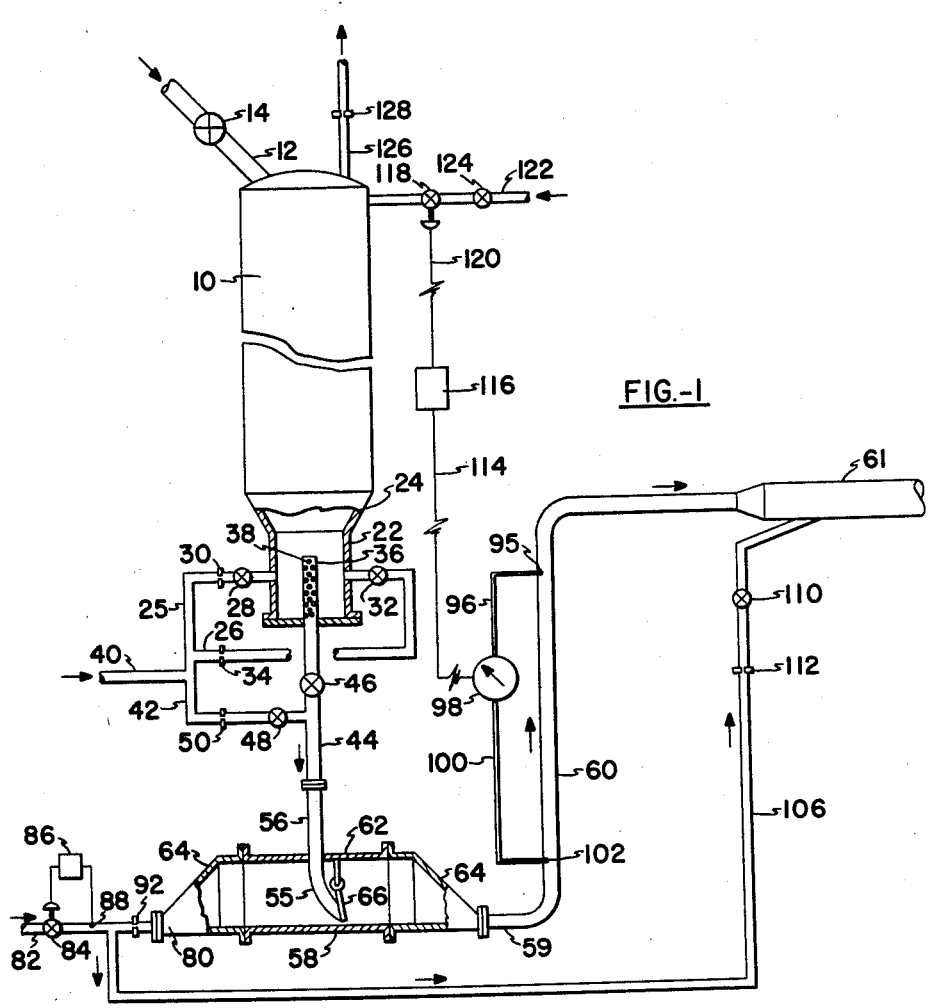
Fig. 1 is a front elevation of a system for feeding fresh active catalyst to a cracking unit with parts being in cross section to facilitate the disclosure.

Referring now to the drawing and first more particularly to Fig. 1, the reference character 10 designates a vertical cylindrical storage drum adapted to contain a charge of finely divided solids to be introduced into a unit in which such finely divided particles are held. Instead of a storage drum, vessel 10 may be a smaller catalyst addition drum. While the specific invention is especially adapted for introducing a constant amount of cracking catalyst to a catalytic cracking unit and will be described in connection with catalytic cracking, it is to be understood that the invention is adapted for use in processes where it is necessary to continuously or periodically introduce fresh catalyst or contact particles into a system or unit without upsetting or stopping the system or process.

The drum 10 is preferentially of a size sufficient to hold a minimum of about one day's supply of finely divided silica-alumina catalyst containing about 13 to 40% alumina. The capacity of an addition drum may be between 5 to 25 tons, depending on the size of the catalytic cracking unit. If drum 10 is also used as a storage drum, the capacity may be between 25 and 300 tons, depending on the size of the cracking unit. The catalyst is of an average size mostly between about 20 and 100 microns with some particles above and some below the size range given. Extending down at an angle through the top head of the drum 10 is an inlet line 12 for loading catalyst particles into the drum. Line 12 is provided with a valve 14 for shutting off the supply of catalyst particles to the drum.

The bottom portion of vessel or drum 10 has a bottom reduced cylindrical pot 22 connected to a lower portion of vessel or drum 10 by a conical frustum 24. The pot 22 is of a smaller size than drum 10 to receive a relatively small amount of catalyst or other solids as the smaller amount of solids is easier to fluidize by the aerating gas. Aerating gas is supplied to the pot 22 by bleed lines 25 and 26 presently to be described and as aeration gas passes upward through pot 22, the solids in the pot and in the area directly above become aerated or fluidized, and thereby can be made to flow freely out of drum 10. In the specific form shown in Fig. 1, two aeration bleed lines 25 and 26 are provided. More or less bleed lines may be used. Each line has a shut off valve and a restriction orifice. Bleed line 25 has valve 28 and restriction orifice 30. Bleed line 26 has valve 32 and restriction orifice 34. Only enough aeration gas is used to permit free flow of catalyst from pot 22 to line 44 presently to be described.

Each of the bleed lines 25 and 26 is fed air or gas under pressure from main line 40. Gas line 40 is provided to supply aeration gas to pot 22 and to also supply aeration gas to permit flow of the finely divided catalyst or solids from drum 10 into pot 22. A branch line 42 leads from main line 40 to line 44 which forms an outlet line or drawoff line for the bottom of drum or vessel 10. The drawoff line 44 communicates with the bottom of the pot 22. Line 44 has an extension 36 inside pot 22 which is closed at its upper end and provided with holes 38 in the wall thereof. The holes 38 have a diameter of about ¼ to ½ the diameter of pipe 44, and the area of all of the holes is about twice the cross-sectional area of pipe 44. Extension 36 is provided to prevent large pieces of debris found in fresh catalyst from plugging line 44. Line 36, 44 is between 1 and 4 feet long and is sized for a solids velocity of between 0.4 and 4 feet per second. Line 36 extends about 6 to 15 inches into pot 22. Line 44 is provided with a shut-off valve 46. Valve 46 is shut when it becomes necessary to refill drum 10. Branch line 42 is provided with a valve 48 which is normally closed and is used only when it is necessary to blow out line 44. Branch line 42 also has a restriction orifice 50.

Line 44 extends downward vertically from valve 46 and joins enlarged horizontal conduit section 58. Line 56 forms a vertical extension of line 44 and extends into the enlarged section 58 through the upper wall thereof as line or section 55. Line 55 bends at an angle to the right as viewed in Fig. 1. Catalyst particles discharge from the outlet end of line 55 into enlarged section 58. Outlet pipe 59 leads from the outlet end of the enlarged section 58 into metering riser 60 and subsequently into enlarged pipe 61 for delivering catalyst particles either directly to the regeneration zone of the catalytic cracking unit or to the riser leading to the regeneration zone (not shown). The enlarged section 58 functions as a catalyst or solids dispersion zone and comprises a central enlarged pipe 62 flanged at its ends and connected at each flanged end with one of the reduced end sections 64. The flanges provide a means of disassembling section 58 for inspection.

The outlet end of catalyst feed line 55 is arranged within the central or middle enlarged pipe section 62 and has a flapper valve 66 loosely hinged at 68. The construction of the flapper valve 66 and enlarged pipe section 62 is shown enlarged in Figs. 2, 3 and 4. In Figs. 3 and 4 are shown enlarged details of line 55 and the method of pivotally supporting flapper valve 66. Line 55 bends toward the horizontal so that flapper valve 66 may seal the open end of line 55. As shown in Fig. 3 the pipe 55 is a 45° elbow portion. This angle may be between about 25° and 50° so that the direction of flow in line 55 has a vertical component. Also, the horizontal distance from the vertical axis of line 44 and the outlet end of pipe 55 is as short as possible, preferably from 1″ to 3″.

The outlet end of pipe or elbow portion 55 has a lower curved extension 55′ cut at an angle of about 10° from the vertical with the lower end 70 extending to the right from the vertical in Fig. 3. The angle is not restricted to 10° but may be between about 5° and 30°. With the lower end 70 of pipe 55 extending to the right it will be noted that after the catalyst or solids have emptied out of line 55, the flapper valve will fall against the open outlet end of pipe 55 to close it and prevent back flow of gas up line 55. Damper or flapper valve 66 also functions to prevent reverse flow of air through line 55 into catalyst addition drum 10 at any time during the catalyst addition operation. This is important since diverting air from the metering riser 60 will cause an erroneous indication of flow on the catalyst meter, and the necessity of having all of the air pass through the metering riser will be made clear hereinafter.

As shown in Fig. 4 the upper part of flapper valve 66 is shown as rectangular and the lower part as elliptical, fitting over the open elliptical outlet end 72 of pipe 55. The upper end of valve 66 has two spaced rings 74 and 76 welded or otherwise secured thereto so that the rings extend from the upper end of the valve. The planes of the rings are parallel to each other and perpendicular to the upper edge of the valve plate 66 and the common axis of the two rings is in an extension of the plane of valve plate 66. The axle or hinge 68 is formed as a U-shaped member 78 having the free ends of the U-member welded or otherwise secured to the upper inner wall of the enlarged section 58. The hinge 68 forms a loose fit with the openings in rings 74 and 76 so that there is no binding when the valve 66 is moved to open or closed positions.

Figure 2:
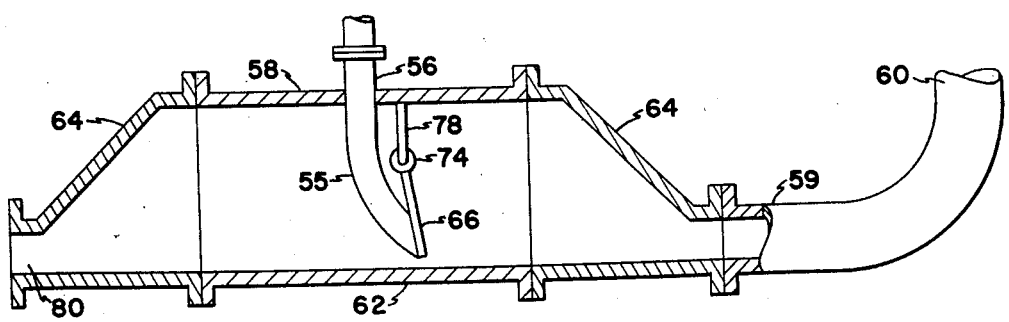
Fig. 2 represents a detail of the conduit through which gas is passing at a constant velocity and into which catalyst is being delivered.

In Figs. 1, 2 and 3 the flapper valve 66 opens from left to right and the gas flow is from left to right. Alternately, the valve action in relation to gas flow may be reversed; that is, with the same valve action as depicted in Fig. 3, the gas flow could be from right to left.

Section 58 is a dispersion or mixing zone for air and catalyst and is shown in Fig. 4 as having a circular cross-section, but the cross-section may also be of another shape, such as rectangular. Referring now to Fig. 2, section 58 is enlarged to contain valve 66 and hinge 68, and is reduced at the outlet end 64 to the same circular cross-section as metering riser 60. The inlet end 80 at the left is reduced to the inlet pipe size.

Referring now to Fig. 1, air or suspending gas is introduced into the inlet end 80 of enlarged section 58 through line 82. The air or other gas must have sufficient velocity to disperse and accelerate the solid particles in zone 58. Provision is made for this by designing zone 58 cross-section so that the velocity in zone 58 is preferably above about 1 ft./sec. The volumetric rate of gas flow into section 58 is fixed by the gas velocity in the metering riser as will be described later. Gas is supplied to section 58 from line 82 and the volumetric flow rate is maintained substantially constant by passing the gas at constant pressure through restriction orifice 92.

A constant gas pressure is maintained at point 88 upstream of orifice 92 by control valve 84 which is positioned by pressure controller 86. An alternate way of supplying a constant volumetric air flow to catalyst disperser 58 would be to substitute a gas rotameter controller in the gas line at 92 in place of pressure controller 86 and restriction orifice 92.

The outlet end 59 of enlarged section 58 leads to the metering riser 60 comprising a vertical section of circular pipe of uniform diameter into which the air-catalyst mixture is passed. Line 60 leads into larger line 61 and line 61 leads to the spent catalyst riser or to the regenerator (not shown) of the catalytic cracking unit. Connecting with line 61 is branch line 106 leading from inlet gas line 82. Branch line 106 contains a restriction orifice 112 and valve 110 which is normally open. Branch line 106 is provided to supply additional air to establish a gas velocity of about 10 to 40 feet per second in line 61 as the catalyst-gas mixture passes from smaller line 60 into larger line 61. The larger cross-section area of line 61 reduces catalyst mass velocity to between 100 and 1000 pounds per minute per square foot of cross-section and this decreases pressure drop in the line 61 to the catalytic cracking unit.

Metering riser 60 has connecting lines 96 and 100 which lead to pressure differential controller or indicator 98. Line 96 is the low pressure meter lead for differential pressure indicator 98 and connects preferentially with the upper vertical section of riser 60 at point 95. Line 100 is the high pressure meter lead for differential pressure indicator 98 and connects with the lower vertical section of riser 60 at point 102. Alternately, point 95 may be located in the upper horizontal section of riser 60 and point 102 may be located in the bottom horizontal section 59 of riser 60 or in catalyst disperser 58.

The differential pressure indicator 98 measures the pressure differential from the bottom to the top of metering riser 60; that is, from point 102 to point 95. At constant gas velocity the pressure differential resulting from passing a gas-solids mixture upwardly through the meter riser 60 is proportional to the solids rate. A constant gas velocity is maintained by introducing a constant volume of air to catalyst disperser 58 as previously described.

The amount of air introduced into metering riser 60 and the diameter and length of riser 60 are selected to meet specific catalyst addition requirements. The diameter of metering riser 60 is selected to give a solids mass velocity in the range of 500 to 5000 pounds per minute per square foot, since in this range a small percentage change in catalyst rate will produce a measurable change in pressure differential per foot of vertical length. A metering riser will function at solids mass velocities above and below 500 to 5000 pounds per minute per square foot, but this is the preferred range. An air velocity in riser 60 of 5 to 30 feet per second is preferred for good metering and to keep erosion in the riser to a minimum. The vertical length of riser 60 is preferably between 10 and 30 feet. The total pressure differential across the riser increases with riser vertical length, and the 10 to 30-foot distance is preferred for both metering accuracy and for maintaining a minimum pressure differential across the system.

The pressure differential indicator 98 also functions as a controller device to regulate the amount of catalyst leaving line 55 and passing into metering riser 60. The output signal from indicator controller 98 is relayed in any suitable manner by line 114 (pneumatically, electrically, mechanically or the like) to an actuating means 116 which in turn is connected by line 120 to a control valve 118 in air or aeration gas supply line 122 containing valve 124 and leading into the top of drum 10. Air or other gas is passed from line 122 through control valve 118 as needed to increase the pressure in drum 10 to cause more catalyst particles to flow out of the bottom of drum 10. Connected to the top of drum 10 is air vent line 126 containing restriction orifice 128. Air is continuously vented from line 126 during the catalyst addition step so that if the catalyst rate indicated on meter riser 60 should exceed the selected value, control valve 118 will close and drum 10 will be depressed to cause the catalyst rate out of drum 10 to be reduced. Restriction orifice 128 is sized to pass the quantity of air that is introduced to drum 10 through lines 25, 26, and 122 when control valve 118 is about one-half open, or about 25 to 150 standard cubic feet per minute.

An alternate pressuring and depressuring system for drum 10 is a system wherein control valve 118 is eliminated and line 120 is connected to another control valve located in vent line 126. In this system air is introduced to drum 10 through lines 25 and 26 and through an air supply line at the top of drum 10 similar to line 122 but containing a restriction orifice instead of control valve 118, and pressure in drum 10 is regulated by controlling the air passing through the control valve in vent line 126.

The catalyst addition device shown in Fig. 1 operates as follows: With the addition drum 10 filled with finely divided catalyst, valve 14 in line 12 being closed and aeration gas being introduced into the bottom of addition drum through bleeds 25 and 26 and control valve 118 being positioned by pressure differential controller 98, catalyst flows down through line 44 out of damper valve 66 into the enlarged pipe section 58. A known quantity of air at constant pressure is passed through restriction orifice 92 and into the inlet end of enlarged pipe section 58 to pick up the catalyst delivered by outlet line 55. The rate of flow of catalyst out of line 55 is a function of the pressure in line 55 which is fixed by the pressure at the top of drum 10 and the head of catalyst in the drum. As the head of catalyst decreases and the pressure in line 55 begins to drop, less catalyst will flow out of valve 66 and consequently the pressure differential across metering riser 60 from point 102 to point 95 will start to decrease. This tendency for the pressure drop to decrease is overcome by the action of pressure differential controller 98 which opens control valve 118 to introduce gas under pressure to drum 10 to build up pressure in the top of drum 10, and this pressure will force more catalyst out of drum 10 to maintain the pressure drop across meter riser 60 substantially constant.

If the flow of catalyst from drum 10 is too great at the beginning of the operation or at any later time and the pressure drop across metering riser 60 is too great, the instrument 98 will close control valve 118 to reduce the pressure in the top of drum 10.

The present invention is adaptable for use with a one-drum system wherein one vessel is used for both storage and addition of catalyst, or with a two-drum system wherein catalyst is transferred from a storage drum to a smaller addition drum for addition to the unit. The present invention can also be adapted for use with any pressure vessel functioning as a catalyst storage or addition drum and of the type normally provided for catalytic cracking units.

The operation of this invention is hereinafter described in detail. When loading the drum 10, valve 124 is closed and valve 14 in line 12 is open so that catalyst flows through line 12 into drum 10. Valve 46 in outlet line 44 and valves 28 and 32 in bleed lines 25 and 26, respectively, are closed so that no aeration gas is introduced into the drum 10. When the drum has been charged, valve 14 in line 12 is closed. Then valve 124 in line 122 is opened. Air under a pressure between about 40 and 100 p.s.i.g. is introduced into line 40 and valves 28 and 32 in bleed lines 25 and 26, respectively, are opened. The restriction orifices 30 and 34 in bleed lines 25 and 26, respectively, maintain a constant flow of air into the pot 22 at the bottom of the drum 10 to fluidize the catalyst. The orifices are selected to give a total superficial velocity in the pot 22 of drum 10 between about 0.3 and 3.0 ft./sec. While two bleed lines 25 and 26 are shown, it is to be understood that this number may vary as desired but normally the number will be between two and four depending on the size of pot 22. Valve 48 in line 42 is closed. Valve 48 is provided to blow out line 55, if necessary.

The air in line 82 under a pressure between about 40 and 100 p.s.i.g. is then turned on and a constant quantity of air between about 300 and 1800 cubic feet per minute per square foot of riser 60 cross-section is passed through restriction orifice 92 into the enlarged pipe section 58. The branch line 106 carries more air to line 61 through restriction orifice 112, such that the total gas flow in line 61 is preferentially 1200 to 2400 cubic feet per minute per square foot of line 61 cross-section. Then valve 46 in line 44 is opened.

The catalyst flow meter 98 has previously been calibrated by observing the pressure differential from point 102 to point 95 for various catalyst flow rates at the fixed air velocity. The catalyst addition rate is selected and the pressure differential recorder controller instrument 98 is set to maintain the pressure differential corresponding to the selected catalyst flow rate. With zero catalyst flow in riser 60, the indicated pressure differential is lower than the selected value, so the controller 98 opens control valve 118. As the flow of air into the drum 10 exceeds the air vent rate out of line 126, pressure in the drum gradually builds up until the catalyst discharging from the bottom of drum 10 causes the pressure differential in riser 60 to increase to the selected value.

With a controlled amount of air, say 900 cubic feet per minute per square foot of riser 60 cross-section, passing through restriction orifice 92 into enlarged pipe section 58 and a pressure differential between pot 22 and enlarged pipe section 58 of between 1 and 5 p.s.i. and with valve 46 open, catalyst of about 20 to 100 micron size and having a compacted density of 30 to 40 pounds per cubic foot will flow at a certain rate, such as between about 600 and 6000 pounds per minute per square foot through discharge line 44 into enlarged pipe section or dispersion zone 58, because the catalyst in the lower portion of the drum is fluidized and under a higher pressure than the pressure in catalyst disperser 58. With a catalyst rate in the riser 60 of between 300 and 3000 pounds per minute per square foot of riser 60 cross-section and the air rate from line 82 in the range given, the pressure drop through riser meter 60 having a vertical height of 12 feet will be between about 0.05 and 1.00 p.s.i. For metering risers of different vertical heights, the pressure drop for a given catalyst flow will be directly proportional to vertical height.

As the addition of catalyst progresses, the level of catalyst in drum 10 will drop. When the catalyst level in drum 10 has fallen to say about 10 feet, the head of catalyst in drum 10 will have decreased as much as 2 to 3 pounds per square inch, and if a constant pressure were maintained on top of drum 10, the catalyst rate would normally decrease to less than one half of the selected flow and in some cases would stop altogether before the addition was finished. However, in this invention, the pressure differential controller 98 varies the pressure on drum 10 so as to maintain a constant flow of catalyst from drum 10. Thus if the pressure in pot 22 had decreased 2 p.s.i. and the flow had decreased to 50% of the normal rate, the pressure drop through meter riser 60 would have fallen to about 50% of the selected pressure drop. This fall of pressure drop is registered by the pressure differential recorder and controller 98 which then actuates control valve 118 through actuating means 116 and 120 to move valve 118 toward open position to increase the back pressure in the top of drum 10. Under this increased back pressure the discharge rate of catalyst from line 55 will rise and when the pressure on drum 10 has been increased by about 2 pounds per square inch, the normal rate of catalyst flow will have been reestablished, and the selected pressure drop will be registering on meter 98.

Should pot 22 or catalyst line 36 or 44 become partially plugged (as might happen temporarily) and cause a decrease in catalyst flow through riser 60, a lower pressure drop will register on meter 98 and the controller action will increase the pressure on drum 10 and on pot 22 above that normally required to discharge the selected flow of catalyst, since with a partial plug a higher pressure drop from pot 22 to enlarged section 58 would be required to pass the same amount of catalyst. The pressure on drum 10 would increase above normal until the selected catalyst rate is reestablished, since control valve 118 is actuated by catalyst flow meter 98 and not by the pressure on drum 10.

This compensating action of controller 98 continues to maintain the pressure drop across meter riser 60 substantially constant so that the catalyst is delivered from drum 10 to the unit at a substantially constant rate over the time of addition of the catalyst to the unit. After the drum 10 is empty, the air lines and catalyst discharge lines are closed off and the drum refilled with catalyst.

In a specific embodiment of the apparatus, the drum 10 is an addition drum and has a diameter of about 8 feet and a straight side vertical height of about 20 feet. The pot 22 has a diameter of about 8 inches. The drum is adapted to hold 15 tons of powdered or microspherical silica alumina catalyst. The catalyst inlet line 12 from the storage drum to the addition drum 10 has a diameter of about 12 inches. The inlet line 12 extends down at an angle of about 60° with the vertical.

The outlet line 44 from the bottom of drum has a diameter of about one inch and a length of about 3 feet. Extension 36 inside pot 22 is 8 inches long, 1 inch in diameter, and contains 24 ⅜″ holes. Air line 40 has a diameter of about ¾ of an inch. For one specific embodiment of the process where aeration air is provided for line 40 at about 60 p.s.i.g., the restriction orifices 30 and 34 in bleed lines 25 and 26, respectively, are of a size of about ⅛ of an inch so that the total velocity of the combined streams of air from bleed lines 25 and 26 is about 0.6 foot/sec. in the pot 22. Extension 55 of line 44 inside enlarged pipe section 58 is bent to an angle of about 45° to the vertical and cut off at an angle of 15° to the vertical.

The middle section of enlarged pipe section 58 has a diameter of about 4 inches. The reduced end pipe sections 64 have flanged ends and a smaller outlet diameter of about 1½ inches. The central or middle section 62 has a length of about 10½ inches total. The U-shaped hinge 68, 78 has a circular cross-section of about ¼ of an inch and the distance between the centers of the upper ends 78 is about 1½ inches. The distance between rings 74 and 76 is about 0.9 of an inch. The rings 74 and 76 each have a circular cross-section of about ¼ of an inch and a central hole of about ⁵⁄₁₆ of an inch. The horizontal part 68 of the U-shaped hinge is about 1³⁄₁₆ inches below the top of pipe 62. The outlet end of pipe 55 is about 8 inches from the downstream end of pipe 62. The damper valve 66 is about 2⅝ inches long, by 1.32 inches wide at the top and about ¼ of an inch thick. The bottom 70 of outlet end of catalyst discharge pipe 55 is about ⅛ of an inch above the inner bottom wall of central pipe 62 of enlarged pipe section 58.

The outlet line 59 leading from enlarged pipe section 58 to metering riser 60 is about 1½ inches in diameter and the vertical height of the metering riser is about 12 feet. The superficial velocity of the air passing through enlarged section 58 is about 1 foot/sec. Air under a pressure of about 70 to 100 p.s.i.g. is supplied by line 82 and the pressure is reduced and maintained at about 45 p.s.i.g. at point 88 by pressure controller 86 and control valve 84. The restriction orifice 92 is of a size of about 0.237 of an inch so that about 42 s.c.f.m. flows into the inlet end of enlarged pipe section 58. Line 82 has a diameter of about 2 inches up to branch line 106, and a diameter of 1 inch downstream of branch line 106.

Catalyst from line 55 is introduced into middle section 62 of enlarged pipe section 58 at a rate of about 2000 lbs. per hour. The pressure in enlarged section 58 is about 30 p.s.i.g., which is set by the operating pressure of the regeneration zone of the catalytic cracking unit and the pressure drop in catalyst addition lines 60 and 61. Branch line 106 leading from air line 82 upstream from restriction orifice 92 has an internal diameter of 2 inches and in this embodiment conducts about 250 s.c.f.m. to line 61 downstream from meter line 96 with valve 110 open. Line 106 has a restriction orifice 112 of a size of about 0.508 of an inch. The enlarged line 61 has an internal diameter of about 3 inches.

The superficial velocity in meter riser 60 is about 15 feet per second and with the rate of catalyst addition above given there is a pressure drop in meter riser 60 (12 feet high) about 0.5 p.s.i. At the beginning of the operation the back pressure in drum 10 is about 35 p.s.ig. After about half of the catalyst is emptied out of drum 10, the back-pressure in drum 10 is automatically increased to about 37 p.s.i.g. by differential controller 98 to maintain about the same pressure drop across riser 60 and the same rate of catalyst delivery through meter riser 60. The flow of air in line 82 is maintained substantially constant by pressure controller 84 and the rate of flow of catalyst is maintained substantially constant by pressure differential controller 98 which opens control valve 118 to introduce gas under pressure into drum 10 through line 122 and thus increase the back pressure in drum 10 to compensate for the lower head of catalyst in the drum 10 and to maintain a pressure drop of about 0.5 p.s.i. across meter riser 60. This compensating action of controller 98 and related parts continues until all of the catalyst is discharged from the drum 10.

To empty drum 10 of the 15 tons of catalyst ordinarily will take about 15 hours at the selected pressure differential setting of 0.5 p.s.i. on meter 98, and the catalyst will be delivered at a substantially constant rate. This rate may be changed by selecting another pressure differential setting on meter 98.

The rest of the air passed through branch line 106 is introduced into larger line 61 as above mentioned and thereby increases the superficial velocity of the air in line 61 to about 20 feet per second for this specific embodiment. However, for other apparatus, the superficial velocity of the air in line 61 may be varied between about 10 and 40 feet per second.

While a specific apparatus and method of introducing silica alumina catalyst have been described it is to be understood that the invention is not to be restricted thereto as modifications and changes can be made without departing from the spirit of the invention.

What is claimed is:

1. A method for adding make-up solids to a contacting process at a substantially constant, gradual rate for a period of time, which includes fluidizing finely divided solids in a confined storage zone providing a superatmospheric pressure in said confined storage zone, maintaining said solids in a fluidized condition in said confined storage zone, withdrawing a confined stream of fluidized solids from the bottom of said confined storage zone and passing the fluidized solids downwardly into a dispersion zone, introducing suspending gas at a substantially constant rate into said dispersion zone to form a suspension, passing the resulting suspension upwardly through a vertical confined path at a linear velocity in the range of about 5 to 30 ft./second and corresponding to a solids mass velocity in the range of 500 to 5000 lbs./min./sq. ft. to create a pressure drop, measuring the pressure drop along said confined path from the bottom to the top of said vertical path and utilizing any variation in said pressure drop to control the pressure in said confined storage zone to vary the back pressure in said confined storage zone without substantially altering the constant rate of flow of the suspending gas passing into said dispersion zone when said pressure drop varies to maintain the flow of finely divided solids to said dispersion zone and to said vertical confined path substantially constant.

2. A method according to claim 1 wherein finely divided catalyst is periodically added to the regeneration zone of a cracking unit and as the catalyst level falls in said confined storage zone, less catalyst is passed from said confined storage zone to said dispersion chamber and the pressure drop along said vertical confined path falls and when this happens increasing the back pressure in said confined storage zone to increase the flow of catalyst to said dispersion zone.

3. An apparatus for adding make-up solids to a contacting process which comprises a storage drum for holding a batch of finely divided solids to be introduced at a substantially constant rate to a contacting zone, control means for pressuring and depressuring said drum, means for introducing fluidizing gas into the bottom portion of said drum, means for withdrawing fluidized finely divided solids from the bottom portion of said drum, a dispersion chamber below said drum, said withdrawal means communicating with said dispersion chamber, means for introducing gas at a substantially constant rate of flow into the upstream side of said dispersion chamber for forming a suspension of solids in gas in said dispersion chamber, a vertical upwardly directed meter riser for receiving the gaseous suspension of solids from said dispersion chamber, differential pressure means for measuring the pressure drop across said vertical meter riser from the bottom to the top thereof and means associated with said differential pressure means for maintaining the pressure drop across said meter riser substantially constant, said pressure drop maintaining means being connected to said control means for pressuring and depressuring said drum and thereby control the rate of flow of solids from said drum.

4. An apparatus according to claim 3 wherein the means of pressuring or depressuring said drum comprises a high pressure gas supply line communicating with the upper portion of said drum, a control valve in said supply line to regulate the flow of gas into said drum, and a vent having a fixed opening for releasing gas from said drum.

5. An apparatus according to claim 3 wherein the means for pressuring and depressuring said drum comprises a high pressure gas supply line communicating with the upper portion of said drum, a fixed opening through which the gas must pass to enter said drum, a vent line communicating with the upper portion of said drum for releasing gas from said drum and a valve in said vent line.

6. An apparatus according to claim 3 wherein said catalyst withdrawal means includes a line which extends into said dispersion chamber and is provided with a self closing damper valve loosely hinged to prevent back flow of gas to said drum.

7. An apparatus for adding make-up solids to a contacting zone which comprises a storage drum for holding a batch of finely divided solids to be introduced at a substantially constant rate to the contacting zone, means for maintaining pressure in said drum, means for introducing fluidizing gas into the lower portion of said drum, means for withdrawing fluidized solids from the bottom portion of said drum, said withdrawal means including a vertically arranged pipe provided at its upper end with a plurality of openings and having its perforated upper end extending into the lower portion of said drum, a dispersion chamber below said drum, the lower end of said pipe extending into said dispersion chamber and being bent toward the horizontal, means for introducing gas at a substantially constant rate of flow into the upstream side of said dispersion chamber to form a suspension of solids in gas in said dispersion chamber, a vertically directed meter riser communicating with the outlet end of said dispersion chamber for receiving the gaseous suspension from said dispersion chamber, differential pressure indicating means for indicating the pressure drop across the length of said vertical riser, control means associated with said differential pressure indicating means for maintaining the pressure drop across said meter riser substantially constant, said last mentioned control means being associated with said pressure maintaining means to maintain a sufficient pressure in said drum to flow solids through said meter riser at a substantially constant rate.

8. An apparatus according to claim 7 wherein conduit means are provided for receiving the suspension of solids leaving said meter riser, said conduit means being of a larger diameter than that of said meter riser for conducting the solids to a contacting zone, and a line for supplying fluidizing gas to the inlet of said conduit means.

9. A method of adding solids to a contacting process at a substantially constant, gradual rate, which comprises fluidizing solids in a confined storage zone, withdrawing a confined stream of fluidized solids from the bottom of said confined zone and passing the withdrawn fluidized solids vertically downwards into a dispersion zone, introducing suspending gas at a substantially constant rate into said dispersion zone to form a gaseous suspension of solids, passing the resulting solids suspension upwardly through a vertical confined path at a linear velocity in the range of 5 to 30 ft./second and corresponding to a mass velocity in the range of 500 to 5000 lbs./min./sq. ft. to create a pressure drop across the length of said vertical confined path, and utilizing any variation in said pressure drop to vary the back pressure in said confined storage zone to maintain a substantially constant rate of flow of solids through said vertical confined path.

10. A method for adding make-up solids to a contacting process at a substantially constant rate for a period of time, which includes fluidizing finely divided solids in a confined storage zone, maintaining said confined storage zone under superatmospheric pressure, maintaining said solids in a fluidized condition in said storage zone, withdrawing a confined stream of fluidized solids from the lower portion of said confined storage zone and passing the stream of fluidized solids downwardly into a dispersion zone, introducing suspending gas at a substantially constant rate of flow into said dispersion zone to form a gaseous suspension of solids, passing the resulting solids suspension upwardly through a vertical confined path of substantially uniform diameter to create a pressure drop along the length of said confined path, measuring the pressure drop from near the outlet of said dispersion zone and from the bottom portion to the top portion of said vertical path and utilizing any variation in said pressure drop to vary the superatmospheric pressure in said confined storage zone without substantially altering the substantially constant rate of flow of the suspending gas passing into said dispersion zone to maintain the flow of finely divided solids to said dispersion zone and to said vertical confined path substantially constant.

11. A method for adding make-up solids to a contacting process at a substantially constant rate for a period of time, which includes fluidizing finely divided solids in a confined storage zone, maintaining a superatmospheric back pressure in said confined storage zone, maintaining said solids in a fluidized condition in said storage zone, withdrawing a confined stream of fluidized solids from the lower portion of said confined storage zone and passing the stream of fluidized solids downwardly into a dispersion zone, introducing suspending gas at a substantially constant rate into said dispersion zone to form a gaseous suspension of solids, passing the resulting solids suspension upwardly through a vertical confined path of substantially uniform diameter to create a pressure drop along the length of said confined path, measuring the pressure drop from near the bottom portion of said vertical path to near the top portion thereof and utilizing any variation in said pressure drop to vary the superatmospheric back pressure in said confined storage zone according to the amount of solids in said confined storage zone without substantially altering the substantially constant rate of flow of the suspending gas passing into said dispersion zone to prevent a change in the flow of finely divided solids to said dispersion zone and to said vertical confined path.

12. A method of adding solids to a contacting process at a substantially constant rate, which comprises fluidizing solids in a confined zone, withdrawing a confined stream of fluidized solids from the bottom of said confined zone and passing the withdrawing fluidized solids into a dispersion zone, introducing suspending gas at a substantially constant rate of flow into said dispersion zone to form a suspension, passing the resulting suspension upwardly through a vertical confined path to create a pressure drop along said confined path, and utilizing any variation in said pressure drop to vary the back pressure in said confined zone to maintain a substantially constant rate of flow of solids through said vertical confined path.

References Cited in the file of this patent

UNITED STATES PATENTS

| | | |
|---|---|---|
| 2,392,764 | Reeves | Jan. 8, 1946 |
| 2,424,147 | Campbell | July 15, 1947 |
| 2,432,822 | Secor | Dec. 16, 1947 |
| 2,515,371 | Jewell | July 18, 1950 |
| 2,696,462 | Bodkin | Dec. 7, 1954 |
| 2,763,597 | Martin et al. | Sept. 18, 1956 |
| 2,834,656 | Watson | May 13, 1958 |

OTHER REFERENCES

Petroleum Refiner, vol. 35, No. 4, p. 203, April 1956.